United States Patent
Malahy

(10) Patent No.: US 10,129,198 B2
(45) Date of Patent: *Nov. 13, 2018

(54) CONTEXTUALLY DRIVEN MESSAGING SYSTEM

(71) Applicant: Google LLC, Mountain View, CA (US)

(72) Inventor: Evan Nicklas Wu Malahy, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/793,683

(22) Filed: Oct. 25, 2017

(65) Prior Publication Data

US 2018/0048610 A1 Feb. 15, 2018

Related U.S. Application Data

(63) Continuation of application No. 14/736,226, filed on Jun. 10, 2015, now Pat. No. 9,807,045.

(51) Int. Cl.
*H04L 12/58* (2006.01)
*G10L 13/02* (2013.01)
(Continued)

(52) U.S. Cl.
CPC ........... *H04L 51/24* (2013.01); *G06Q 10/107* (2013.01); *G10L 13/02* (2013.01); *H04L 51/00* (2013.01);
(Continued)

(58) Field of Classification Search
None
See application file for complete search history.

(56) References Cited

U.S. PATENT DOCUMENTS 6,757,362 B1 6/2004 Cooper et al.
6,941,266 B1 9/2005 Gorin et al.
(Continued)

FOREIGN PATENT DOCUMENTS

WO 2007044806 A2 4/2007
WO 2013048880 A1 4/2013

OTHER PUBLICATIONS

"DriveSafe.ly—The App to Stop Distracted Driving", iSpeech [online]. Retrieved from the Internet: <http://www.drivesafe.ly/> First accessed on Apr. 8, 2015. 2 pgs.
(Continued)

*Primary Examiner* — Neeraj Sharma
(74) *Attorney, Agent, or Firm* — Shumaker & Sieffert, P.A.

(57) ABSTRACT

A method may include receiving, by a computing device associated with a user, a message from an origination source and receiving, by the computing device, an audio input. The method may also include determining, by the computing device and based at least in part on the audio input and contextual information, a probability that the user intends to send a response message to the origination source. The method may further include, responsive to determining that the probability the user intends to send the response message to the origination source satisfies a threshold probability, determining, by the computing device, that the user intends to send the response message to the origination source. The method may also include, responsive to determining that the user intends to send the response message to the origination source, generating, by the computing device and based on the audio input, the response message, and sending, by the computing device, the response message to the origination source.

20 Claims, 6 Drawing Sheets

(51) Int. Cl.
*G06Q 10/10* (2012.01)
*H04M 1/725* (2006.01)
*G10L 15/26* (2006.01)

(52) U.S. Cl.
CPC ......... *H04M 1/72552* (2013.01); *G10L 15/26* (2013.01); *H04L 51/02* (2013.01); *H04M 1/72569* (2013.01)

(56) References Cited

U.S. PATENT DOCUMENTS

| | | | |
|---|---|---|---|
| 7,409,335 | B1 | 8/2008 | Horvitz et al. |
| 7,792,701 | B2 | 9/2010 | Basson et al. |
| 7,904,297 | B2 | 3/2011 | Mirkovic et al. |
| 8,880,406 | B2* | 11/2014 | Santos-Lang ............ G10L 15/22 434/169 |
| 2007/0127688 | A1 | 6/2007 | Doulton |
| 2007/0192110 | A1 | 8/2007 | Mizutani et al. |
| 2008/0270380 | A1* | 10/2008 | Ohrn ................. G06F 17/30654 |
| 2009/0138828 | A1 | 5/2009 | Schultz et al. |
| 2011/0206198 | A1* | 8/2011 | Freedman ............... G06Q 30/06 379/265.03 |
| 2012/0022872 | A1 | 1/2012 | Gruber et al. |
| 2012/0035931 | A1 | 2/2012 | LeBeau et al. |
| 2012/0036016 | A1* | 2/2012 | Hoffberg ................ G05B 15/02 705/14.58 |
| 2012/0300014 | A1* | 11/2012 | Krantz ................... H04N 7/142 348/14.08 |
| 2013/0215116 | A1* | 8/2013 | Siddique ............ G06Q 30/0643 345/420 |
| 2013/0325978 | A1* | 12/2013 | Mansfield .............. G06Q 50/01 709/206 |
| 2014/0095504 | A1* | 4/2014 | Soroushian ......... G06F 17/3002 707/737 |
| 2014/0188460 | A1 | 7/2014 | Ouyang et al. |
| 2014/0189027 | A1 | 7/2014 | Zhang et al. |
| 2014/0365209 | A1 | 12/2014 | Evermann |
| 2015/0058310 | A1* | 2/2015 | Mukherjee ........ G06F 17/30867 707/706 |
| 2015/0163188 | A1 | 6/2015 | Faaborg et al. |
| 2015/0195406 | A1* | 7/2015 | Dwyer ................ H04M 3/5175 379/265.07 |
| 2015/0348548 | A1 | 12/2015 | Piernot et al. |
| 2016/0132501 | A1 | 5/2016 | Mengle et al. |
| 2016/0366084 | A1 | 12/2016 | Malahy |

OTHER PUBLICATIONS

Rob J. "ReadItToMe—Unique Handsfree", Android Apps on Google Play [online]. Jul. 3, 2013. Retrieved from the Internet: <https://play.google.com/store/apps/details?id=robj.readit.tomefree&hl=en> 4 pgs.

Ucic "UbiSPEAK", Android Apps on Google Play [online]. Feb. 11, 2015. Retrieved from the Internet: <https://play.google.com/store/apps/details?id=com.ucic.ubispeak> 3 pgs.

International Search Report and Written Opinion of International Application No. PCT/US2016/030855, dated Jul. 1, 2016, 18 pgs.

Prosecution History from U.S. Appl. No. 14/736,226, dated Mar. 16, 2017 through Aug. 4, 2017, 74 pp.

International Preliminary Report on Patentability from International Application No. PCT/US2016/030855, dated Dec. 21, 2017, 12 pp.

* cited by examiner

CONTEXTUALLY DRIVEN MESSAGING SYSTEM

RELATED APPLICATION

This application is a continuation of U.S. application Ser. No. 14/736,226, filed Jun. 10, 2015, the entire contents of which is incorporated herein by reference.

BACKGROUND

Some computing devices are configured with speech-to-text functionality for converting spoken language into written form. For example, a computing device can be configured with speech-to-text functionality that can receive audio input (e.g. a user's voice) and determine text content (e.g., SMS message, email, device command, search query, etc.) based on the audio input. Some computing devices are configured with text-to-speech functionality for converting written text to a spoken word. For example, a computing device can be configured with text-to-speech functionality that can receive text content and output audio indicative of the text content.

A user may command a computing device to listen for audio input in order for the computing device to receive the audio input and convert the audio input to text. The user may be required to confirm the contents of the message and command the computing device to send the message. The user may be required to go through these steps every time the user wishes to send a message.

Likewise, a computing device may receive a text communication and ask the user whether the user would like to hear the contents of the communication. The computing device may prompt the user before converting the text to speech every time a text communication is received.

SUMMARY

In one example, a method may include receiving, by a computing device associated with a user, a message from an origination source and receiving, by the computing device, an audio input. The method may include determining, by the computing device and based at least in part on the audio input and contextual information, a probability that the user intends to send a response message to the origination source. The method may further include, responsive to determining that the probability the user intends to send the response message to the origination source satisfies a threshold probability, determining, by the computing device, that the user intends to send the response message to the origination source. The method may also include, responsive to determining that the user intends to send the response message to the origination source, generating, by the computing device and based on the audio input, the response message, and sending, by the computing device, the response message to the origination source.

In another example, a device may include an audio output device, an audio input device, a communication unit, and a message management module operable by the at least one processor. The message management module may receive, via the communication unit, a message from an origination source. The message management module may also receive, via the audio input device, an audio input. The message management module may further determine, based at least in part on the audio input and contextual information, a probability that a user associated with the device intends to send a response message to the origination source. The message management module may, responsive to determining that the probability the user intends to send the response message to the origination source satisfies a threshold probability, determine, that the user intends to send the response message to the origination source. The message management module may also, responsive to determining that the user intends to send the response message to the origination source, generate, based on the audio input, the response message, and send, via the communication unit, the response message to the origination source.

In another example, a computer-readable storage medium may include instructions that, when executed, configure one or more processors of a computing system to receive a message from an origination source, receive an audio input, determine, based at least in part on the audio input and contextual information, a probability that a user associated with the computing system intends to send a response message to the origination source, and responsive to determining that the probability the user intends to send the response message to the origination source satisfies a threshold probability, determine that the user intends to send the response message to the origination source. The instructions, when executed, further configure the one or more processors to, responsive to determining that the user intends to send the response message to the origination source, generate, based on the audio input, the response message, and send the response message to the origination source.

In another example, a method may include outputting, by a computing device associated with a user, an audio signal representing a text message from an origination source. The method may include receiving, by the computing device, audio data representing an utterance from the user. The method may also include, without any additional input from the user, determining, by the computing device, a probability that the user intends to send a response based at least in part on the audio data and one or more of frequency of incoming messages from the origination source, frequency of outgoing messages to the origination source, time since the last received message from the origination source, or time since the last sent message to the origination source. The method may further include, responsive to determining that the probability satisfies a threshold and without any additional input from the user, transmitting a transcription of at least part of the audio data to the origination source.

The details of one or more examples are set forth in the accompanying drawings and the description below. Other features, objects, and advantages of the disclosure will be apparent from the description and drawings, and from the claims.

DETAILED DESCRIPTION

In general, techniques of this disclosure may enable a computing device to automatically determine that a user is engaged in a text mediated conversation and facilitate the text mediated conversation. In some examples, the computing device may automatically perform text-to-speech conversions on incoming communications and automatically perform speech-to-text conversions on outgoing communications. In various instances, techniques of this disclosure may enable a computing device to intelligently determine an intended recipient of an outgoing communication. A computing device may determine a probability that the user intends to send a message to a particular recipient, and determine whether to send a message to the particular recipient based on the probability. In this way, rather than requiring the user to command the computing device to send a message and confirm the recipient and contents of the message, techniques of this disclosure may enable the computing device to automatically detect the conversation and automatically determine an intended recipient of an outgoing communication, which may reduce the amount of user interaction required for the user to participate in the conversation.

Figure 1:
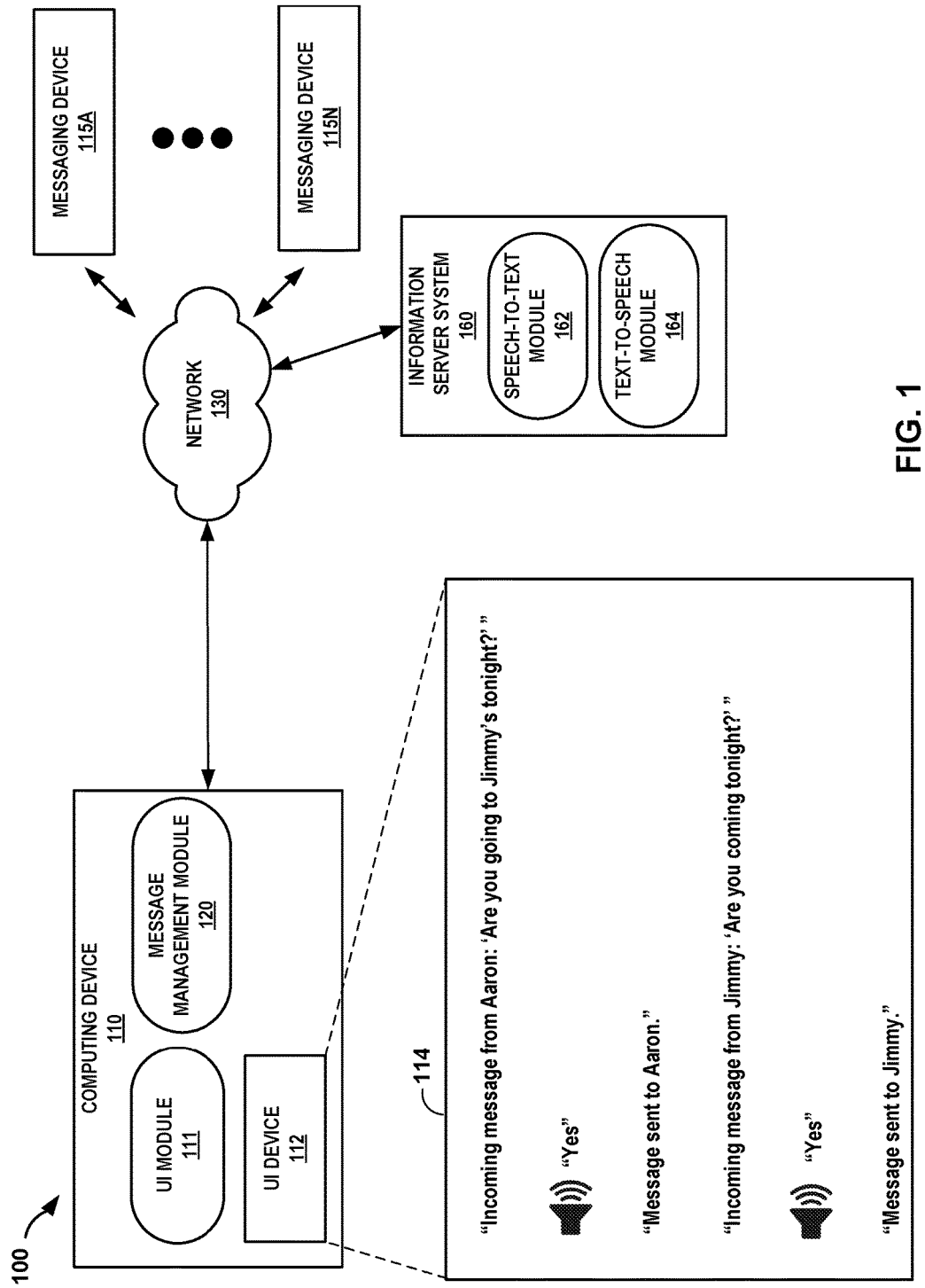
FIG. 1 is a conceptual diagram illustrating an example system for sending and receiving text-based messages, in accordance with one or more aspects of the present disclosure.

FIG. 1 is a conceptual diagram illustrating system 100 as an example system for sending and receiving text-based messages, in accordance with one or more aspects of the present disclosure. System 100 includes computing device 110, information server system ("ISS") 160, and messaging devices 115A-115N (collectively, "messaging devices 115") that are communicatively coupled via network 130.

Messaging devices 115 each represent a computing device, such as a mobile phone, laptop computer, desktop computer, or any other type of computing device configured to send and receive information via a network, such as network 130. Messaging devices 115 include text-based messaging applications for sending and receiving text-based messages, such as email, short message service (SMS), multi-media messaging service (MMS), instant messages (IM), or other types of text-based messages. Messaging devices 115 constitute a group of messaging devices from which respective users associated with messaging devices 115A-115N may send text-based messages to computing device 110 and receive text-based messages from computing device 110.

Computing device 110 may represent a mobile device, such as a mobile phone, a tablet computer, a laptop computer, computerized watch, computerized eyewear, computerized gloves, or any other type of portable computing device. Additional examples of computing device 110 include desktop computers, televisions, personal digital assistants (PDA), portable gaming systems, media players, e-book readers, mobile television platforms, automobile navigation and entertainment systems, or any other types of wearable and non-wearable computing devices configured to send and receive information via a network, such as network 130.

Computing device 110 includes a user interface device 112, a user interface (UI) module 111, and a message management module (MMM) 120. Modules 111, 120 may perform operations described using software, hardware, firmware, or a mixture of hardware, software, and firmware residing in and/or executing at computing device 110. Computing device 110 may execute modules 111, 120 with multiple processors or multiple devices. Computing device 110 may execute modules 111, 120 as virtual machines executing on underlying hardware. Modules 111, 120 may execute as one or more services of an operating system or computing platform. Modules 111, 120 may execute as one or more executable programs at an application layer of a computing platform.

UID 112 of computing device 110 may function as respective input and/or output devices for computing device 110. UID 112 may be implemented using various technologies. For instance, UID 112 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. In addition, UID 112 may include microphone technologies, infrared sensor technologies, or other input device technology for use in receiving user input.

UID 112 may function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. In addition, UID 112 may include speaker technologies, haptic feedback technologies, or other output device technology for use in outputting information to a user.

UID 112 may each include respective presence-sensitive displays that may receive tactile input from a user of respective computing device 110. UID 112 may receive indications of tactile input by detecting one or more gestures from a user (e.g., the user touching or pointing to one or more locations of UID 112 with a finger or a stylus pen). UID 112 may present output to a user, for instance at respective presence-sensitive displays. UID 112 may present the output as respective graphical user interfaces (e.g., user interface 114), which may be associated with functionality provided by computing device 110. For example, UID 112 may present various user interfaces (e.g., user interface 114) related to text-based messages or other features of computing platforms, operating systems, applications, and/or services executing at or accessible from computing device 110 (e.g., electronic message applications, Internet browser applications, mobile or desktop operating systems, etc.). UID 112 may output audio signals to a user, for instance using a speaker. For example, UID 112 may output audio signals indicative of the content of a text-based message.

UI module 111 manages user interactions with UID 112 and other components of computing device 110. UI module 111 may cause UID 112 to output a user interface, such as user interface 114 (or other example user interfaces) for display, as a user of computing device 110 views output and/or provides input at UID 112. UI module 111 and UID 112 may receive one or more indications of input from users as the users interact with the user interfaces, at different times and when the users and computing device 110 are at different locations. UI module 111 and UID 112 may interpret inputs detected at UID 112 and may relay information about the inputs detected at UID 112 to one or more associated platforms, operating systems, applications, and/or services executing at computing device 110, for example, to cause computing device 110 to perform functions.

UI module 111 may receive information and instructions from one or more associated platforms, operating systems, applications, and/or services executing at computing device 110 and/or one or more remote computing systems, such as ISS 160. In addition, UI module 111 may act as intermediaries between the one or more associated platforms, operating systems, applications, and/or services executing at computing device 110, various output devices of computing device 110 (e.g., speakers, LED indicators, audio or electrostatic haptic output device, etc.) to produce output (e.g., a graphic, a flash of light, a sound, a haptic response, etc.) with computing device 110.

ISS 160 represents any suitable remote computing system, such as one or more desktop computers, laptop computers, mainframes, servers, cloud computing systems, etc. capable of sending and receiving information both to and from a network, such as network 130. ISS 160 hosts (or at least provides access to) speech-to-text services for converting speech to text-based messages and text-to-speech services for converting text-based messages to audio data. In some examples, ISS 160 represents a cloud computing system that provides speech-to-text and text-to-speech services through network 130 to one or more computing device 110 that access the speech-to-text and text-to-speech services via access to the cloud provided by ISS 160.

Network 130 represents any public or private communications network, for instance, cellular, Wi-Fi, and/or other types of networks, for transmitting data between computing systems, servers, and computing devices. Network 130 may include one or more network hubs, network switches, network routers, or any other network equipment, that are operatively inter-coupled thereby providing for the exchange of information between ISS 160, computing device 110, and messaging devices 115. Computing device 110, messaging devices 115, and ISS 160 may transmit and receive data across network 130 using any suitable communication techniques.

ISS 160, computing device 110, and messaging devices 115 may each be operatively coupled to network 130 using respective network links. ISS 160, computing device 110, and messaging devices 115 may be operatively coupled to network 130 using a different network link. The links coupling ISS 160, computing device 110, and messaging devices to network 130 may be Ethernet, ATM or other types of network connections, and such connections may be wireless and/or wired connections.

In accordance with techniques of this disclosure, system 100 may automatically detect the conversation and automatically determine an intended recipient of an outgoing communication. For example, one or more messaging devices 115 may send a message to computing device 110 via network 130. Computing device 110 receives the message and may, in response, output an indication of the message. Computing device 110 may determine whether to output a visual (e.g., graphical) or audio indication of the message. Computing device 110 may determine whether to output an indication of the message without any additional input (e.g., audio or gesture-based input) from the user.

In response to determining to output an audio indication of the message, computing device 110 may convert the text-based message to audio data indicative of the message by performing text-to-speech processing on the message. In some examples, to convert the text-based message to audio data, computing device 110 may send at least a portion of the message to ISS 160 for text-to-speech processing. Text-to-speech module 164 of ISS 160 may convert at least a portion of the message to audio data and ISS 160 may send the audio data to computing device 110. In various instances, computing device 110 and ISS 160 may each perform text-to-speech processing on at least a portion of the message to convert the text-based message to audio data indicative of the message. Computing device 110 may output the audio data via UID 112.

After computing device 110 outputs audio data indicative of the received message, computing device 110 may detect a user speaking (e.g., engaged in a conversation with another person, providing audio input to computing device 110, singing along with a song on the radio, etc.). Computing device 110 may receive audio data of the speech via UID 112 and determine, based on the audio data, whether to send a text-based response message. Computing device 110 may determine whether to send a text-based response message without any additional input (e.g., audio or gesture-based input) from the user.

If computing device 110 determines that the user intended to send a response message, computing device 110 may convert the audio data to text data indicative of the audio data by performing speech-to-text processing on the audio data. In some examples, computing device 110 may send at least a portion of the audio data to ISS 160 for speech-to-text processing. Speech-to-text module 162 may convert at least a portion of the audio data to text data and ISS 160 may send the text data to computing device 110. In some examples, computing device 110 and ISS 160 may both perform speech-to-text processing on at least a portion of the audio data and convert the audio data to text data indicative of the audio data. Computing device 110 may generate a text-based response message using the text data. Computing device 110 may send the response message to a particular messaging device 115.

Computing device 110 may receive a text-based message from messaging device 115A. Messaging device 115A may be associated with a contact in a contact list of computing device 115 (e.g., Aaron). Computing device 110 may output a graphical indication of the message via UI 114. For example, computing device 110 may cause UI 114 to output the message "Incoming message from Aaron: 'Are you coming to Jimmy's tonight?'" Likewise, computing device 110 may receive a text-based message from a second messaging device 115B, which may be associated with a contact in a contact list for computing device 110 (e.g., Jimmy). Computing device 110 may cause UI 114 to output the message "Incoming message from Jimmy: 'Are you coming to tonight?'"

In some examples, MMM 120 may determine to output an audio indication of the received messages. In some examples, MMM 120 determines whether to output an audio indication of the message without any additional input from the user. In response to determining to output an audio indication of the first message, computing device 110 may cause UID 112 (e.g., a speaker) to output the audio data "Incoming message from Aaron: 'Are you coming to Jimmy's tonight?'" In response to determining to output an audio indication of the second message, computing device 110 may cause UID 112 (e.g., a speaker) to output the audio data "Incoming message from Jimmy: 'Are you coming to tonight?'"

After computing device 110 outputs the audio data indicative of the first received message and/or the second received message, a user of computing device 110 may speak a response. For example, the user may respond to the first received message by saying "Yes." Computing device 110 may detect the user's response and may receive audio data indicative of the response via UID 112 (e.g., a microphone). MMM 120 may determine whether to send a text-based response message to messaging device 115A. In some examples, MMM 120 may make the determination whether to send a response message without any additional input from the user. In response to determining to send a response message to messaging device 115A, computing device 110 may generate a text-based response message based on the audio data. Computing device 110 may send the response message to messaging device 115A. In some examples, computing device 110 may output a visual or audio indication that the response message has been sent. For example, computing device may output the audio data "Message sent to Aaron."

A user of computing device 110 may respond to the second received message, for example, by saying "Yes." Computing device 110 may detect the user's response and MMM 120 may determine whether to send a text-based response message to one or both of messaging devices 115A, 115B. In some examples, MMM 120 may make the determination without any additional input from the user. In some examples, MMM 120 may determine to send a response message to only one messaging device (e.g., messaging device 115B). Computing device 110 may generate a text-based response message based on the audio data. Computing device 110 may send the response message to messaging device 115B. In some examples, computing device 110 may output a visual or audio indication that the response message has been sent. For example, computing device may output the audio data "Message sent to Jimmy."

Techniques of this disclosure may simplify and speed up the exchange of text-based messages. By automatically determining whether a user is engaged in a text-based conversation, techniques of this disclosure may reduce or eliminate cumbersome and time-consuming prompts, voice confirmations, and touch inputs that would otherwise be required to send a text-based message or listen to a received text-based message. Techniques of this disclosure may enable a computing device to efficiently process communications, transforming the conversation from a laborious, transaction-oriented approach to a more natural conversational approach.

Figure 2:
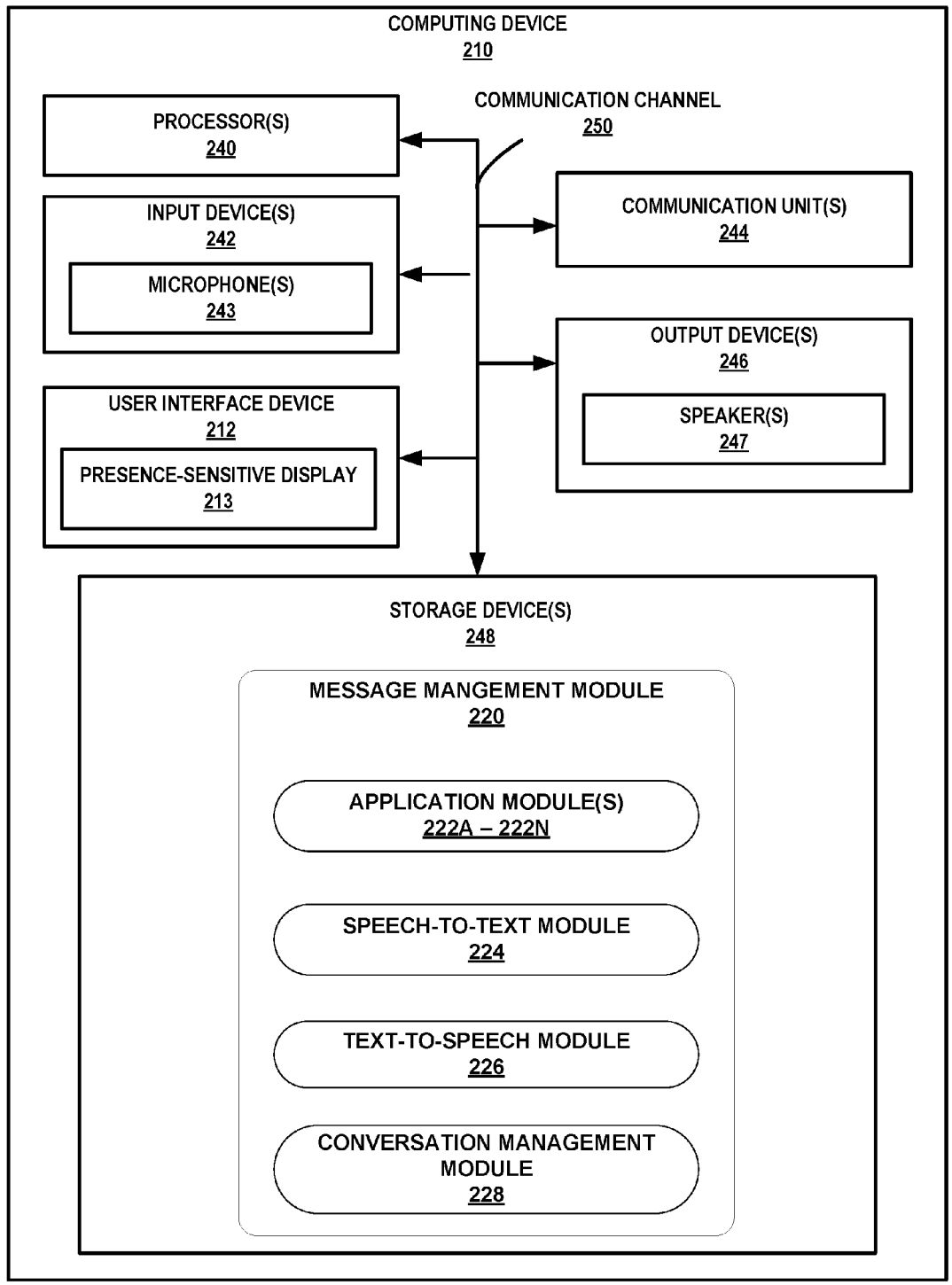
FIG. 2 is a block diagram illustrating an example computing device configured to send and receive text-based messages, in accordance with one or more aspects of the present disclosure.

FIG. 2 is a conceptual diagram illustrating an example computing device configured to send and receive text-based messages. Computing device 210 of FIG. 2 is described below within the context of FIG. 1. FIG. 2 illustrates only one particular example of computing device 210, and many other examples of computing device 210 may be used in other instances. Other examples of computing device 210 may include a subset of the components included in example computing device 210 or may include additional components not shown in FIG. 2.

As shown in the example of FIG. 2, computing device 210 includes user interface device (UID) 212, one or more processors 240, one or more input devices 242, one or more communication units 244, one or more output devices 246, and one or more storage devices 248. Storage device 248 of computing device 210 also includes message management module 220. MMM 220 may include application modules 222A-222N (collectively referred to as "application modules 222"), speech-to-text module 224, text-to-speech module 226, and conversation management module (CMM) 228. One or more communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other technique for communicating data.

One or more input devices 242 of computing device 210 may receive input. Examples of input are tactile, motion, audio, and video input. Input devices 242 of computing device 210, in one example, includes a presence-sensitive display 213, touch-sensitive screen, mouse, keyboard, voice responsive system, video camera, microphone (e.g., microphone 243), or any other type of device for detecting input from a human or machine.

One or more output devices 246 of computing device 210 may generate output. Examples of output are tactile, audio, electromagnetic, and video output. Output devices 246 of computing device 210, in one example, includes a presence-sensitive display, speaker (e.g., speaker 247), cathode ray tube (CRT) monitor, liquid crystal display (LCD), motor, actuator, electromagnet, piezoelectric sensor, or any other type of device for generating output to a human or machine. Output devices 246 may utilize one or more of a sound card or video graphics adapter card to produce auditory or visual output, respectively.

One or more communication units 244 of computing device 210 may communicate with external devices via one or more networks by transmitting and/or receiving network signals on the one or more networks. Communication units 244 may connect to any public or private communication network. For example, computing device 210 may use communication unit 244 to transmit and/or receive radio signals on a radio network such as a cellular radio network. Likewise, communication units 244 may transmit and/or receive satellite signals on a Global Navigation Satellite System (GNSS) network such as the Global Positioning System (GPS). Examples of communication unit 244 include a network interface card (e.g., an Ethernet card), an optical transceiver, a radio frequency transceiver, a GPS receiver, or any other type of device that can send or receive information. Other examples of communication units 244 may include short wave radios, cellular data radios, wireless Ethernet network radios (e.g., WiFi), as well as universal serial bus (USB) controllers.

One or more storage devices 248 within computing device 210 may store information for processing during operation of computing device 210. In some examples, storage device 248 functions as a temporary memory, meaning that storage device 248 is not used for long-term storage. Storage devices 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248 may be configured to store larger amounts of information than volatile memory. Storage devices 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or data associated with modules 220, 222, 224, 226, and 228.

One or more processors 240 may implement functionality and/or execute instructions within computing device 210. For example, processors 240 on computing device 210 may receive and execute instructions stored by storage devices 248 that execute the functionality of message management module 220, application modules 222, speech-to-text module 224, text-to-speech module 226, and CMM 228. These instructions executed by processors 240 may cause computing device 210 to store information within storage devices 248 during program execution. Processors 240 may execute instructions in modules 220, 222, 224, 226, and 228 to convert an audio input to text and send a text-based message based on the audio input, or to convert a text-based message to speech and output an audio output based on the text-based message. That is, modules 220, 222, 224, 226, and 228 may be operable by processors 240 to perform various actions, including converting received audio data and sending the transcribed data to a remote device, and converting received text data to audio data and outputting the audio data.

Application modules 222 may include any other application that computing device 210 may execute in addition to the other modules specifically described in this disclosure. For example, application modules 222 may include messaging applications (e.g., email, SMS, MIMS, IM, or other text-based messaging applications), a web browser, a media player, a file system, a map program, or any other number of applications or features that computing device 210 may include.

In accordance with the techniques of this disclosure, computing device 210 may determine a probability that the user intends to listen to an audio message indicative of a received text-based message. Computing device 210 may receive a text-based message via communication unit 244. CMM 228 may determine whether to output an audio indication of the message based on a probability that the user intends to listen to an audio version of the message.

CMM 228 may determine the probability that a user of computing device 110 intends to listen to an audio version of a text-based message based on contextual information. Contextual information may include the frequency of incoming messages from a particular messaging device 115 (e.g., messaging device 115A), frequency of outgoing messages to messaging device 115A, elapsed time since the last received message from messaging device 115A, elapsed time since the last sent message to messaging device 115A, as non-limiting examples. For example, the user of computing device 210 may exchange frequent SMS messages with messaging device 115A over a predefined period of time. Due to the frequency of SMS messages between the user and messaging device 115A, CMM 228 may determine that there is a high probability the user intends to listen to an audio version of the message. The user of computing device 210 may exchange sporadic SMS messages with a different one of messaging devices 115 (e.g., messaging device 115N) over a predefined period of time. Based on the sporadic message exchange with messaging device 115N, CMM 228 may determine that there is a low probability the user intends to listen to an audio version of the message from messaging device 115N.

The contextual information used to determine the probability may also include one or more of the user's location, a time of day, calendar entries of a calendar of the user, whether a message is sent to (or received from) a contact in the user's contact list, or whether the user recently engaged in a phone conversation with a user of a particular messaging device 115. In some examples, the contextual information may also include one or more of actions taken by the user, such as using an application (e.g., using an internet browser, playing music, using navigation, taking a photo, etc.), muting computing device 210, sending or receiving a voice message (e.g., a phone call or video chat), sending or receiving a text-based message, speaking a command to computing device 210, or any other actions that may indicate whether a user of computing device 220 intends to listen to an audio version of a received text-based message.

CMM 228 may determine the probability that the user intends listen to a received message based on one type of contextual information. For example, if the user starts playing music on computing device 210, CMM 228 may determine that the probability the user intends listen to a message is low. In some examples, CMM 228 may determine the probability that the user intends to listen to a message based on more than one type of contextual information. For example, CMM 228 may determine that the probability the user intends to listen to a received message based on whether the sender is in the user's contact list and the user has exchanged a certain number of messages within a given time period.

In some examples, CMM 228 may consider types of contextual information independently. For example, if CMM 228 determines the probability that the user intends to listen to an audio version of the message based on frequency of incoming messages from messaging device 115 and whether a third-party associated with the messaging device 115 is in the user's contact list, CMM 228 may determine a higher probability if the frequency of incoming message satisfies a threshold or if the third-party is in the user's contact list. However, in some examples, CMM 228 may determine the probability on a weighted basis. For example, CMM 228 may determine a high probability even if the frequency of messages is low but the third-party sending and/or receiving messages is in the user's contact list. In contrast, in some examples, CMM 228 may determine a low probability despite a high frequency of message if the third-party sending and/or receiving message is not in the user's contact list.

CMM 228 may determine whether the user intends to listen to an audio version of a received message by comparing the probability that the user intends to listen to the message to a threshold probability. In some examples, CMM 228 may compare the probability that the user intends to listen to the message to different threshold probabilities. Each of the different threshold probabilities may correspond to a different conversation state, and CMM may take different actions depending on the conversation state.

CMM 228 may determine a conversation state between a user of computing device 210 and messaging device 115 based on the probability that the user intends to listen to a received text-based message. For example, CMM 228 may determine that the user is not engaged in a conversation with a user of messaging device 115, hereafter called a "rest state." In some examples, CMM 228 may determine that a user is modestly engaged in conversation with a user of messaging device 115, hereafter called a "recent state." Further, in some examples, CMM 228 may determine that a user in deeply engaged in conversation with a user of messaging device 115, hereafter called an "active state."

In some examples, CMM 228 may determine a conversation state between the user of computing device 210 and a particular messaging device 115 on an individual basis. In other words, the conversation state between the user and a first messaging device 115 may be different than the conversation state between the user and a second messaging device 115. For example, CMM 228 may determine that a conversation between the user and a particular messaging device 115 is in a recent state and that a conversation between the user and a different messaging device 115 is in an active state. In some examples, CMM 228 may determine the conversation state between the user of computing device 210 and a particular group of messaging devices 115 on a group basis. For example, computing device 210 may determine that the conversation state between the user of computing device 210 and a group of messaging devices 115 (e.g., contacts involved in a group message) so that the conversation state is the same for all members of the group. In some examples, conversation management module may determine a conversation state between the user of computing device 210 and all contacts on a global basis. For example, CMM 228 may determine that the conversation state is a rest state for all conversations (e.g., the user may set computing device 210 in a "do not disturb mode").

CMM 228 may determine that the conversation state is in an active state if the probability that the user intends to listen to an audio version of a received message satisfies a first threshold probability and a second threshold probability (e.g., the probability is greater than both the first threshold probability and the second threshold probability. If CMM 228 determines that the conversation is in an active state, the user may not be required to give any commands to send or listen to a message. For example, in an active state, the user may receive a message from a particular messaging device 115 and computing device 210 may perform text-to-speech processing on the received message without outputting any requests for instructions to the user. Text-to-speech (TTS) module 226 may convert the message to audio data, and computing device 210 may output the audio data via speaker 247.

CMM 228 may determine that the conversation state is in a recent state if the probability that the user intends to listen to an audio version of a received message does not satisfy a first threshold probability but does satisfy a second threshold probability (e.g., the probability is between a first threshold probability and the second threshold probability). If the conversation state is in a recent state, the user may only be required to give minor commands to send or listen to a message. In some examples, in a recent state, TTS module 226 may perform text-to-speech processing on the message to convert the audio data to text data. Computing device 210 may output the audio data with light message context, such as the name of the sender. For example, if computing device 210 receives an SMS, TTS module 226 may convert the text-based message to an audio output such that computing device outputs message context "Jimmy said" and the audio data "Hey buddy. Where are you going tonight?"

CMM 228 may determine that the conversation state is in a rest state if the probability that the user intends to listen to an audio version of a received message does not satisfy either threshold probability (e.g., the probability is less than both the first threshold probability and the second threshold probability). If CMM 228 determines that the conversation state is a rest state, the user may be required to take action to send a message or listen to a received message. Computing device 210 may output a request for additional instructions from the user. For example, in a rest state, computing device 210 may receive a text-based message from a particular messaging device 115 and computing device 210 may output audio asking whether the user would like to listen to the message. For example, computing device 210 may output the audio message "Message received from Jimmy. Would you like to hear the message?"

CMM 228 may determine the conversation state based on the probability that the user intends to listen to a received text-based message. In some examples, CMM 228 may determine the conversation state based on the probability that the user intends to send a message.

In some examples, a user of computing device 210 may speak a message. Computing device 210 may receive the audio input from the user via microphone 243. CMM 228 may determine a probability that the user intends to send a text-based message to a particular messaging device 115. The probability that the user intends to send a message may be based on contextual information, such as the contextual information used to determine whether the user intends to listen to an audio version of a received text-based message. As an additional example, contextual information may include the affirmativeness or strength of a command given by the user to computing device 210. For example a command to "text Jimmy" may be less affirmative than a command to "talk with Jimmy," such that the former command may indicate a lower probability than the latter command.

CMM 228 may determine whether the user intends to send message by comparing the probability that the user intends to send a message to a threshold probability. In some examples, CMM 228 may compare the probability that the user intends to listen to the message to different threshold probabilities. Each of the different threshold probabilities may correspond to a different conversation state, and CMM may take different actions depending on the conversation state.

In some examples, CMM 228 may determine that the conversation is in an active state. In an active state, the user may send a message by saying aloud the message that the user wishes to send, without any commands such as "tell," "text," "send," or any other commands. For example, the user may say "I will be there in five minutes" without specifically stating "send a message to Jimmy." Computing device 210 may receive audio data from a user. Speech-to-text module 224 may perform speech-to-text (STT) processing on the audio data and convert the audio data to text data. CMM 228 may generate a text-based message based on the text data, and computing device 210 may automatically send the message to a particular messaging device 115 (e.g., a messaging device 115 associated with Jimmy).

If CMM 228 determines that the conversation state is in a recent state, the user may be able to send a message to a particular messaging device 115 with minimal commands. For example, the user may speak a message including a message command (e.g., "tell," "text," "send") and message content ("I will be there in five minutes."). Computing device 210 may receive the message command and message content via microphone 243. STT module 224 may convert the audio input to text data. CMM 228 may generate a text-based message based on the text data such that communication module 244 may send a text-based message (where the message states "I will be there in five minutes") without the user confirming either the contents of the message or the user's intent to send the message.

In some examples, CMM 228 may determine that the conversation is in a rest state. If computing device 210 receives an audio input from a user when a conversation is in a rest state, computing device 210 may output a request for additional information from the user. For example, in a rest state, computing device 210 may output a message asking the user to confirm whether the user would like to send a message. Computing device 210 may receive an audio input confirming the user's intent to send a message and may receive an audio input indicative of a message to be sent. STT module 224 may perform speech-to-text processing on the audio input and convert the audio data to text data. CMM 228 may generate a text-based message based on the text data and computing device 210 may send the message to a particular messaging device 115.

Computing device 210 may provide a visual or audible indication of the conversation state to the user. For example, computing device 210 may indicate the conversation status to the user via aural signals (e.g., a series of beeps or text-to-speech notices). In some examples, computing device 210 may indicate the conversation status to the user via a visual notification (e.g., a status icon displayed on screen 114).

CMM 228 may determine different conversation states for incoming messages compared to outgoing messages. For example, CMM 228 may determine a high probability that the user intends to listen to received messages from a particular messaging device 115. However, CMM 228 may determine that probability the user intends to send a message is less than the probability the user intends to listen to a received message. As a result, in some examples, computing device 210 may automatically output an audio version of a received message but may output a request for additional instructions from the user before sending an outgoing message.

Figure 3A:
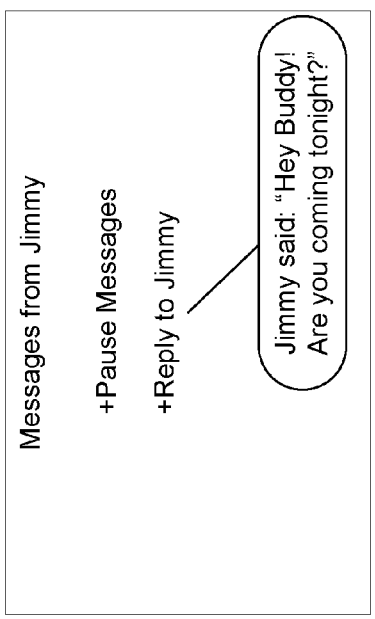
FIGS. 3A-3H are conceptual diagrams illustrating an example operation of the computing device.

FIGS. 3A-3H are conceptual diagrams illustrating an example operation of computing device 210. Computing device 210 may receive a text-based message from an origination source. CMM 228 may determine a probability that the user of computing device 210 intends listen to the received message. CMM 228 may determine the probability based on one or more types of contextual information. For example, if the contextual information includes the frequency of incoming messages from the origination source and the frequency of incoming messages is low, CMM 228 may determine that the probability the user intends to listen does not satisfy a threshold probability. As a result, CMM 228 may determine that the conversation is in a rest state. Computing device 210 may output a message to notify the user of the incoming message (FIG. 3A). For example, computing device 210 may output a message that asks whether the user would like to hear the message. In some examples, the user may confirm his or her intent to listen to the message by saying "yes," "read the message," "ok," or any other response that indicates the user would like to hear the message.

Figure 3B:
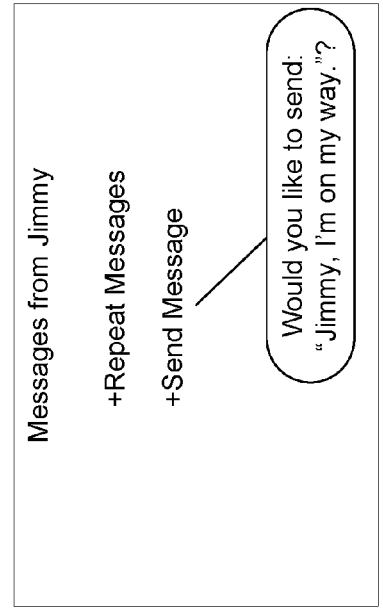

Computing device 210 may receive audio data from the user via microphone 243 indicating that the user would like to hear the contents of the message. TTS module 226 may perform text-to-speech processing on the received text-based message and convert the text data to audio data. In response to receiving a command from the user, computing device 210 may output the audio data indicative of the contents of the text-based message (FIG. 3B). Because CMM 228 determined that the conversation state is in a rest state, computing device may output message context, such as the name of the contact that sent the message. For example, computing device 210 may output the message context (e.g., "Jimmy said") followed by the audio data (e.g., "Hey Buddy! Where are you going tonight?"). In some examples, after outputting the audio data, computing device 210 may output a request for additional commands from the user.

Figure 3C:
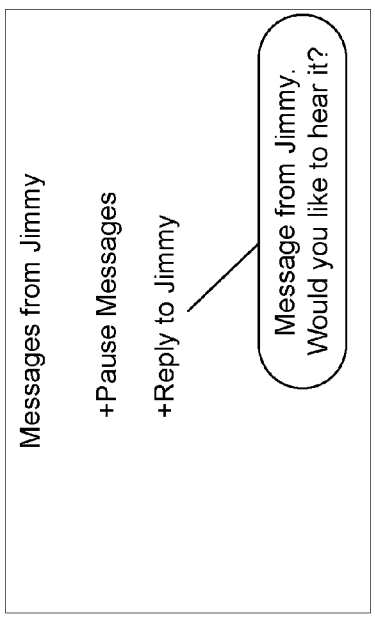
Figure 3D:
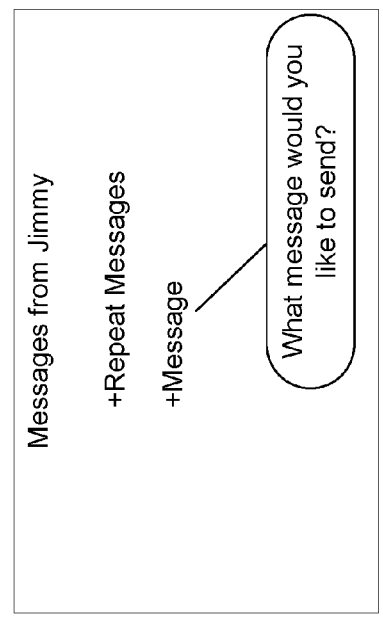
Figure 3E:
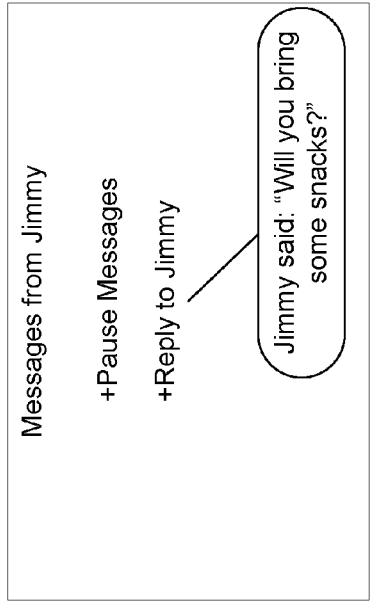

In some examples, the user may command computing device 210 to send a response message to the origination source. For example, the user may say "reply," "tell Jimmy," or any other words that indicate the user would like to send a response message to the origination source. Microphone 243 of computing device 210 may receive the audio input spoken by the user. CMM 228 may determine that probability that the user intends to send a response message to the origination source. In some examples, if computing device 210 has received only one text-based message from the origination source and the user gives a command to reply to the message, CMM 228 may determine that the probability the user intends to send a response message does not satisfy a threshold probability and that the conversation is still in a rest state. As a result, computing device 210 may output a request for a response message (FIG. 3C). Computing device 210 may receive the response message as an audio input via microphone 243. STT module 224 may perform speech-to-text processing on the audio input and convert the audio data to text data. Since the conversation state is still in a rest state, computing device 210 may output a request for the user to confirm whether to send the response message (FIG. 3D). In some examples, computing device 210 may send the response message to the origination source and output a message to confirm to the user that the response message was sent (FIG. 3E).

Figure 3F:
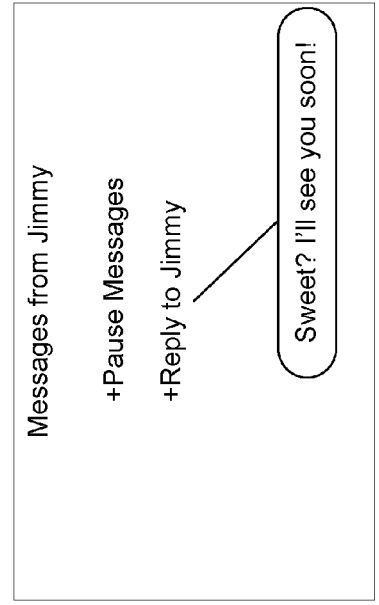
Figure 3G:
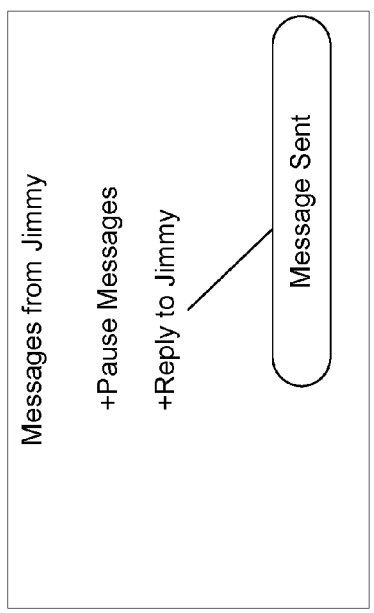

As shown in FIG. 3F, the origination source may send a second text-based message to the user. CMM 228 may determine that the probability that the user intends to listen to the received message has increased based on contextual information (e.g., an increase in the frequency of message between the user and the origination source). CMM 228 may determine that the probability the user intends to listen to the message satisfies a first threshold probability but does not satisfy a second threshold probability (e.g., the probability that the user intends to listen to the message is between a first threshold probability and a second threshold probability). As a result, CMM 228 may determine that the conversation between the user and the origination source in a recent state. In a recent state, TTS module 226 may perform text-to-speech processing on the received message and convert the text data to audio data. Computing device 210 may output the text data automatically. For example, computing device 210 may output message context (e.g., "Jimmy said") followed by the audio data (e.g., "will you bring some snacks?").

In some examples, the user may respond to the message from the origination source by speaking a response message. Computing device 210 may receive the audio data corresponding to the user's response message via microphone 243. For example, the user might say "Tell Jimmy I'll bring cookies." CMM 228 may determine that the response includes a command to send a message (e.g., "Tell Jimmy). CMM 228 may determine that the probability the user intends to send a message satisfies a first threshold probability because the message includes a command, but does not satisfy a second threshold probability. As a result, CMM 228 may determine that the conversation between the user and the origination source is in a recent state. STT module 226 may perform speech-to-text processing on the received audio data and convert the audio data to text data. CMM 228 may generate a text-based response message based on the text data and computing device 210 may send the text-based response message to the origination source.

Figure 3H:
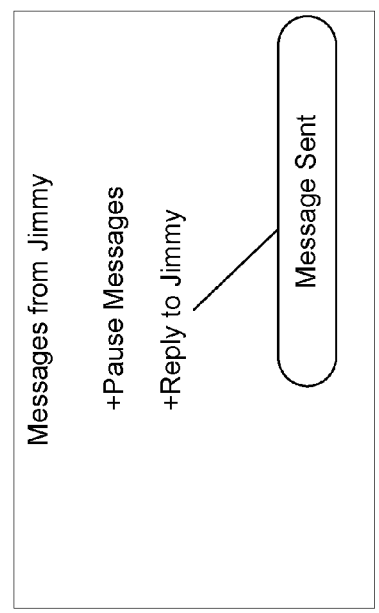

Computing device 210 may receive a third incoming message from the origination source and CMM 228 may determine the probability that the user intends to listen to the received message. For example, based on the frequency of messages exchanged between the user and the origination source, CMM 228 may determine that the probability the user intends to listen to the message satisfies a threshold probability, such that the conversation is in an active state. TTS module 226 may convert the text data to audio data. Computing device 210 may automatically output the audio data (e.g., "Sweet, I'll see you soon!) (FIG. 3H).

For subsequent messages between the user and the origination source, CMM 228 may determine the probability that the user intends to send a message or listen to a received message. If CMM 228 determines that the conversation state has changed, computing device 210 may output prompts and message contextual in accordance with the respective conversation states, as described above.

In some examples, a user may initiate a text-based conversation with a particular messaging device 115. The user may initiate the conversation with a physical input on computing device 210 (e.g., by pressing on presence-sensitive display 5) or by speaking a voice command. Computing device 210 may receive the voice command in the form of audio input via microphone 243. CMM 228 may determine the probability that the user intends to send a text-based message based on the voice command and other contextual information. For example, the user may say "Text Jimmy" such that CMM 228 may determine the probability that the user intends to send a message to the recipient (e.g., Jimmy) and a corresponding conversation state. The probability that the user intends to send a message and the corresponding conversation state may depend on the affirmativeness of the initial command. For example, if the user says "Text Jimmy," CMM 228 may determine one probability, but if the user says "Talk to Jimmy," CMM 228 may determine another probability. CMM 228 may determine that the probability the user intends to send a message to the recipient is greater than a first threshold probability but less than a second threshold probability if the user says "Text Jimmy." However, CMM 228 may determine that the probability the user intends to send a message to the recipient is greater than both the first threshold probability and the second threshold probability if the user says "Talk to Jimmy." As a result, CMM 228 may determine different conversation states depending upon the affirmativeness of the received command.

In some examples, CMM 228 may determine that a conversation has ended (i.e., the probability the user intends to listen to a message is very low) based on explicit actions or commands by the user. For example, the user may press a button on computing device 210 (e.g., on presence-sensitive display 5) to end the conversation. In some examples, CMM 228 may determine that a conversation has ended based on one or more types of contextual information, such as the contents of a message. For example, the user may say "Goodbye" or "End the conversation." If CMM 228 determines the conversation has ended, computing device 210 may require a full set of commands and confirmations from the user in order to send additional messages or listen to received messages.

In some examples, CMM 228 may determine that the probability that the user intends to send a message or listen to a message has gone from low (i.e., the conversation state is a rest state) to high (i.e., the conversation state is an active state), or vice versa, without passing through a middle range. In other words, the conversation state may skip over the recent state if the probability increases or decreases suddenly.

CMM 228 may determine a temporary or transient conversation state. For example, the user may initiate a brief conversation (i.e., the conversation is temporarily in an active state) with a particular messaging device 115 by pressing on the contact information associated with the messaging device 115 for a specified time, or by displaying the contact information associated with the messaging device on screen 114. In some examples, CMM 228 may determine that the conversation remains in the temporary state for a specified time period or as long as the contact information is displayed.

In some examples, a user may become engaged in multiple conversations with different messaging devices 115. For example, computing device 210 may receive a message from a first messaging device 115 and a message from a second messaging device 115. In response to receiving audio data from the user, CMM 228 may determine the probability that the user intends to send a message to a first messaging device 115 and the probability that the user intends to send a message to a second messaging device 115. In some examples, CMM 228 may analyze the contents of the audio data and determine whether the contents of the audio data are more relevant to the conversation with the first messaging device or the second messaging device.

CMM 228 may determine which messaging device 115 should receive the message by comparing the probability that the user intends to send a message to the first messaging device 115 to the probability that the user intends to send a message to a second messaging device 115, and determining which probability is greater. For example, if the probability that the user intends to send the message to the first messaging device 115 is greater than the probability that the user intends to send the message to the second messaging device 115, CMM 228 may determine that the user intends to send the message to the first messaging device 115.

In some examples, CMM 228 may determine which messaging device 115 should receive the message by comparing the probability that the user intends to send a message to the first messaging device 115 to the probability that the user intends to send a message to the second messaging device 115, and comparing each probability to a threshold probability. For example, if the probability that the user intends to send a message to the first messaging device 115 satisfies a threshold probability and the probability that the user intends to send a message to the second messaging device 115 satisfies a threshold probability, CMM 228 may determine that the user intends to send the message to the messaging device 115 associated with the higher probability.

In some examples, CMM 228 may compare the probability that the user intends to send the message to the first messaging device 115 to a threshold probability and compare the probability that the user intends to send the message to the second messaging device 115 to the threshold probability. For example, if CMM 228 determines the probability the user intends to send a message to the first messaging device 115 satisfies a threshold probability and the probability that the user intends to send a message to the second messaging device 115 satisfies a threshold probability, CMM 228 may determine that computing device 210 should send the message to both the first and second messaging devices 115. However, if the probability that the user intends to send a message to a first messaging device 115 satisfies a threshold probability and the probability that the user intends to send a message to the second messaging device 115 satisfies a threshold probability, computing device 210 may output a request for the user to confirm which messaging device 115 should receive the outgoing message.

If the probability that the user intends to send the message to the first messaging device 115 does not exceed a threshold probability and the probability that the user intends to send the message to the second messaging device 115 does not exceed a threshold probability, in some examples, CMM 228 may output a request for the user to confirm whether to send a message. CMM 228 may also output a request for the user to confirm which messaging device 115 should receive the message.

In some examples, the threshold probability for sending a message may change when the user is engaged in multiple conversations. For example, the threshold probability for sending a message in the active state may be a first threshold probability when the user is engaged in only one conversation. However, the threshold probability for sending a message in the active state may increase to a second threshold probability when the user is engaged in more than one conversation (i.e., when there is at least one other conversation that is not in a rest state).

Figure 4:
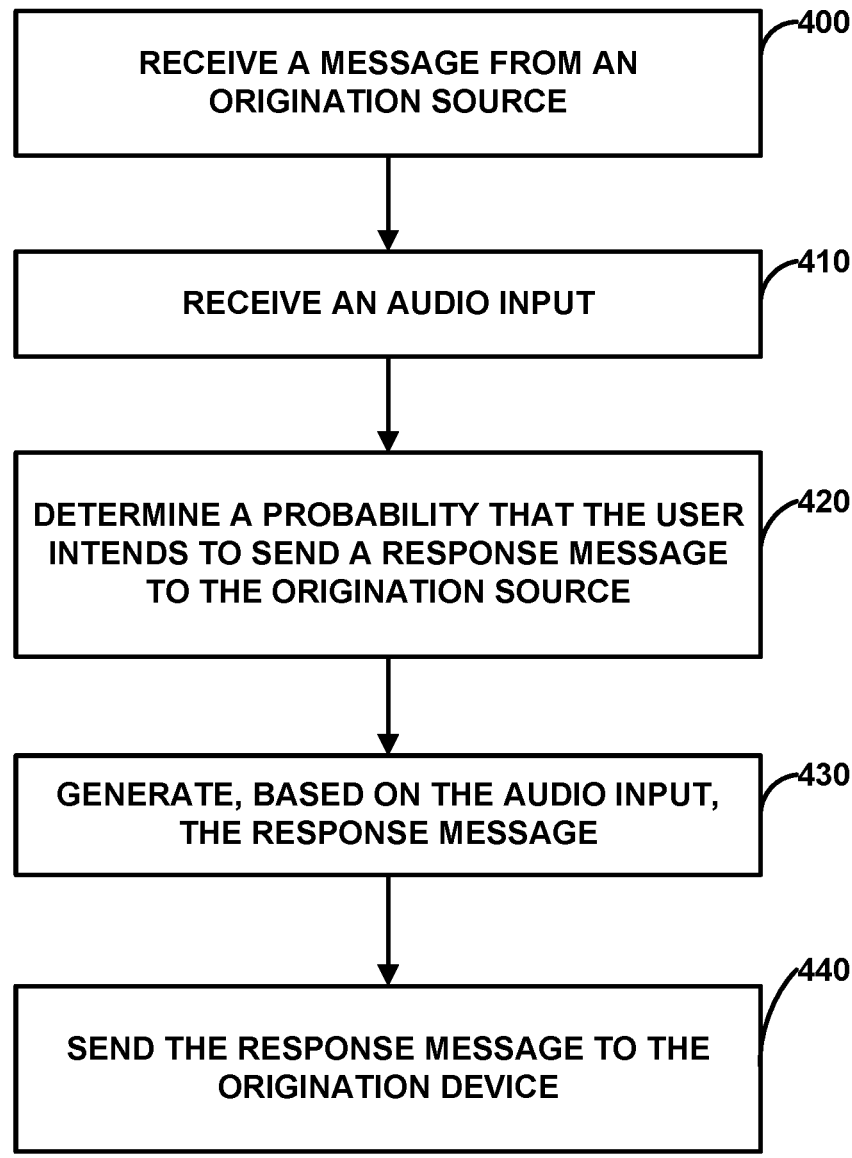
FIG. 4 is a flowchart illustrating an example operation of the computing device.

FIG. 4 is a flowchart illustrating an example operation of computing device 210. In some examples, computing device 210 may receive a text-based message from an origination source (400). The text-based message may include an email, instant message, SMS, or other type of text-based message. CMM 228 may determine the probability that the user intends to listen to an audio version of the message and may compare the probability to a threshold probability. In some examples, TTS module 226 may perform text-to-speech processing on the received message and convert the text data to audio data. Computing device 210 may output the audio data.

Computing device 210 may receive an audio input (410). For example, the user may say a message that is received by microphone 243 of computing device 210. CMM 228 may determine the probability that the user intends to send a response message to the origination source (420). The probability that the user intends to send a response message to the origination source may be based on explicit commands or contextual information. For example, contextual information may include the frequency of messages sent to, and received by, the origination source. CMM 228 may determine whether the probability that the user intends to send a response message to the origination source satisfies a threshold probability. CMM 228 may determine a conversation state (e.g., rest state, recent state, or active state) by comparing the probability that the user intends to send a response message to a first threshold probability and a second threshold probability.

In response to determining that the probability the user intends to send a response message satisfies a threshold probability, computing device 210 may generate the response message based on the audio input (430). For example, computing device 210 may perform speech-to-text processing on the audio input and convert the audio data to text data. CMM 228 may generate a text-based response message based on the text data. Computing device 210 may send the response message to the origination source (440).

In some examples, a method may include outputting, by a computing device associated with a user, an audio signal representing a text message from an origination source. The method may include receiving, by the computing device, audio data representing an utterance from the user. The method may also include, without any additional input (e.g., audio or gesture-based input) from the user, determining, by the computing device, a probability that the user intends to send a response based at least in part on the audio data and one or more of frequency of incoming messages from the origination source, frequency of outgoing messages to the origination source, time since the last received message from the origination source, or time since the last sent message to the origination source. The method may further include, responsive to determining that the probability satisfies a threshold and without any additional input (e.g., audio or gesture-based input) from the user, transmitting a transcription of at least part of the audio data to the origination source.

Figure 5:
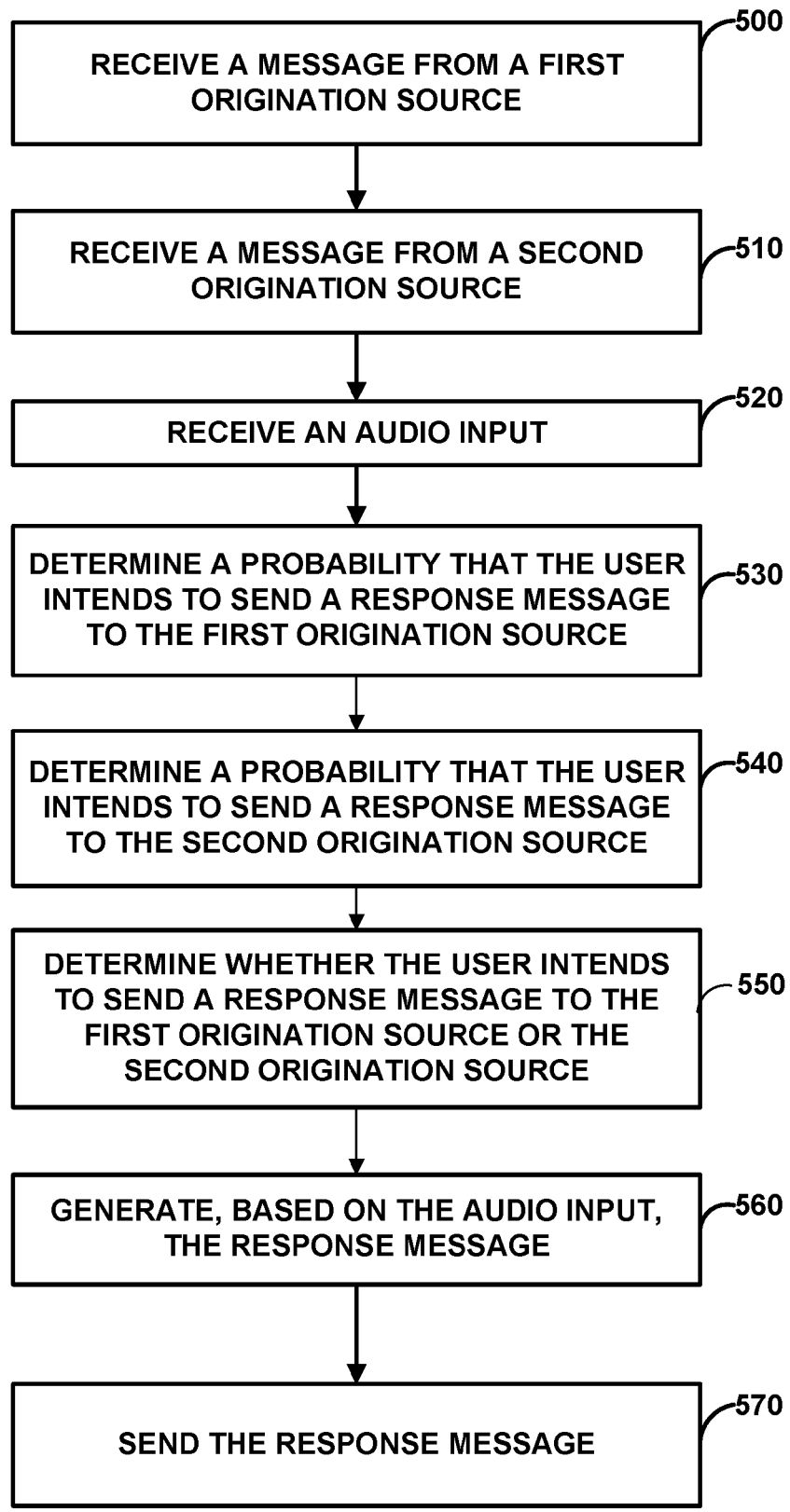
FIG. 5 is a flowchart illustrating an example operation of the computing device.

FIG. 5 is a flowchart illustrating an example operation of the computing device 210. In some examples, a user may become engaged in multiple conversations with different origination sources. For example, computing device 210 may receive a text-based message from a first origination source (i.e., a first messaging device 115) (500). Computing device may receive a text-based message from a second origination source (i.e., a second messaging device 115) (510). The text-based message from the first origination source and the text-based message from the second origination source may include different types of messages. For example, the text-based message from the first origination source may include an SMS message and the text-based message from the second origination source may include an instant message. CMM 228 may determine a probability that the user intends to listen to an audio version of the message from the first origination source. CMM 228 may compare the probability that the user intends to listen to the audio version of the message to a threshold probability. In response to determining that the probability the user intends to listen to an audio version of the message satisfies a threshold probability, TTS module 226 may convert the text data to audio data and computing device 210 may output the audio data. Likewise, computing device 210 may determine a probability that the user intends to listen to an audio version of the message from the second origination source, compare the probability to a threshold probability. In response to determining that the probability satisfies a threshold probability, computing device 210 may convert the text data to audio data and output the audio data.

Computing device 210 may receive an audio input (510). For example, after computing device 210 receives the message from the first origination source and the message from the second origination source, the user may speak a message. Computing device may receive the message from the user as audio input via microphone 243.

CMM 228 may determine a probability that the user intends to send a response message to the first origination source (530). The probability the user intends to send a response message to the first origination source may be based on an explicit command and/or contextual information. An explicit command may include a statement such as "Tell Aaron." Contextual information may include the frequency of messages exchanged between computing device 210 and the first origination source, the time elapsed since the last message exchanged between computing device 210 and the first origination source, or any other type of contextual information.

CMM 228 may determine a probability that the user intends to send a response message to the second origination source (540). The probability the user intends to send a response message to the second origination source may be based on an explicit command and/or contextual information. An explicit command may include a statement such as "Tell Jimmy." Contextual information may include the frequency of messages exchanged between computing device 210 and the second origination source, the time elapsed since the last message exchanged between computing device 210 and the second origination source, or any other type of contextual information.

CMM 228 may determine whether the user intends to send the response message to the first origination source, the second origination source, both the first and second origination sources, or neither origination source (550). In some examples, CMM 228 may compare the probability that the user intends to send a message to the first origination source to the probability that the user intends to send a message to the second origination source, determine which probability is greater, and cause computing device 210 to send the response message to the origination source with the higher probability.

In some examples, CMM 228 may compare the probability that the user intends to send the response message to the first origination source to a threshold probability and compare the probability that the user intends to send the message to the second origination source to the threshold probability. For example, if CMM 228 determines the probability the user intends to send the response message to the first origination source satisfies a threshold probability and the probability that the user intends to send the response message to the second messaging device 115 satisfies a threshold probability, CMM 228 may determine that that the user intends to send the response message to both the first and second origination sources. However, if the probability that the user intends to send a message to a first origination source satisfies a threshold probability and the probability that the user intends to send a message to the second origination source satisfies a threshold probability, computing device 210 may output a request for the user to confirm which origination source should receive the response message. If the probability that the user intends to send the response message to the first origination source does not exceed a threshold probability and the probability that the user intends to send the response message to the second messaging device 115 does not exceed a threshold probability, in some examples, computing device 210 may output a request for the user to confirm whether to send a message. Computing device 210 may also output a request for the user to confirm which origination source should receive the message.

In some examples, CMM 228 may determine whether the user intends to send the response message to the first origination source or the second origination source by comparing the probability that the user intends to send a message to the first origination source to the probability that the user intends to send a message to the second origination source, and comparing the respective probabilities to a threshold probability. For example, if the probability that the user intends to send the response message to the first origination source satisfies a threshold probability and the probability that the user intends to send the response message to the second origination source satisfies a threshold probability, CMM 228 may determine that the user intends to send the message to the origination source associated with the higher probability.

Computing device 210 may generate, based on the audio input, the response message (560). For example, STT module 224 may convert the audio data to text data indicative of the audio data received from the user. In some examples, computing device 210 may send at least a portion of the audio data to ISS 160 for speech-to-text processing, such that ISS 160 may generate text data and send the text data to computing device 210. CMM 228 may generate a text-based response message based on the text data.

After computing device 210 generates the response message, computing device 210 may send the response message (570). The response message may be sent to the origination source(s) determined by CMM 228.

Appended to this description is a plurality of claims directed to various embodiments of the disclosed subject matter. It will be appreciated that embodiments of the disclosed subject matter may also be within the scope of various combinations of said claims, such as dependencies and multiple dependencies therebetween. Therefore, by reference thereto, all such dependencies and multiple dependencies, explicit or otherwise, form a portion of this description.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g.,

a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for automatically detecting a conversation and determining an intended recipient of an outgoing communication, the method comprising:
   receiving, by a computing device associated with a first user, a message from a device associated with a second user;
   receiving, by the computing device, an audio input;
   determining, by the computing device and without outputting a request for instructions to the first user, and based at least in part on the message from the device associated with the second user, the audio input, and contextual information, whether the first user and the second user are engaged in the conversation;
   responsive to determining that the first user and the second user are engaged in the conversation:
      determining, by the computing device, that the second user is the intended recipient of the outgoing communication;
      generating, by the computing device and based on the audio input, the outgoing communication as a response to the message received from the device associated with the second user; and
      sending, by the computing device and without receiving user confirmation of the contents of the outgoing communication or a user instruction to send the outgoing communication, the outgoing communication to the second user.

2. The method of claim 1, wherein determining that the first user and the second user are engaged in the conversation comprises:
   determining, by the computing device and based at least in part on the message from the device associated with the second user, the audio input, and the contextual information, a probability that the first user intends to send the response to the message received from the device associated with the second user,
   wherein determining whether the first user and the second user are engaged in the conversation is based at least in part on the probability.

3. The method of claim 2, further comprising:
   prior to receiving the audio input, receiving, by the computing device, a message from a device associated with a third user;
   after receiving the message from the device associated with the second user:
      determining, by the computing device and based at least in part on the audio input, and the contextual information, a probability that the first user intends to send the outgoing communication as a response to the message received from the device associated with the third user;
      determining, by the computing device and based on the probability that the first user intends to send the outgoing communication as the response to the message received from the device associated with the second user and the probability that the user intends to send the outgoing communication as the response to the message received from the device associated with the third user, whether the user intends to send the outgoing communication as the response to the message received from the device associated with the second user or to the message received from the device associated with the third user; and
   responsive to determining that the user intends to send the outgoing communication as the response to the message received from the device associated with the third user:
      generating, by the computing device and based on the audio input, the response to the message received from the device associated with the third user; and
      sending, by the computing device, the response to the message received from the device associated with the third user.

4. The method of claim 3,
   wherein determining that the user intends to send the outgoing communication as the response to the message received from the device associated with the second user is further responsive to determining that the probability the user intends to send the outgoing communication as the response to the message received from the device associated with the second user satisfies the threshold probability but the probability that the user intends to send the outgoing communication as the response to the message received from the device associated with the third user does not satisfy the threshold probability, and
   wherein determining that the user intends to send the outgoing communication as the response to the message received from the device associated with the third user is further responsive to determining that the probability the user intends to send the outgoing communication as the response to the message received from the device associated with the third user satisfies the threshold probability but the probability that the user intends to send the outgoing communication as the response to the message received from the device associated with the second user does not satisfy than the threshold probability.

5. The method of claim 3,
   wherein determining that the user intends to send the outgoing communication as the response to the message received from the device associated with the second user is further responsive to determining that the probability the user intends to send the outgoing communication as the response to the message received from the device associated with the second user satisfies the threshold probability and is greater than the probability that the user intends to send the outgoing communication as the response to the message received from the device associated with the third user, and
   wherein determining that the user intends to send the outgoing communication as the response to the message received from the device associated with the third user is further responsive to determining that the probability the user intends to send the outgoing communication as the response to the message received from the device associated with the third user satisfies the threshold probability and is greater than the probability that the user intends to send the outgoing communication as the response to the message received from the device associated with the second user.

6. The method of claim 1, further comprising:
   determining, by the computing device, a probability the user intends to listen to the message received from the device associated with the second user; and
   responsive to determining that the probability the user intends to listen to the message received from the device associated with the second user satisfies a threshold probability for listening to messages:
      generating, by the computing device and based on the message received from the device associated with the second user, audio data; and
      outputting, by the computing device, the audio data.

7. The method of claim 1, wherein the contextual information includes one or more of:
   a frequency of incoming messages from the device associated with the second user, a frequency of outgoing messages to the device associated with the second user, an amount of time that has elapsed since a last received message from the device associated with the second user, or an amount of time that has elapsed since a last sent message to the device associated with the second user.

8. The method of claim 2, wherein the probability that the user intends to send the response to the message to the device associated with the second user is not based a user command.

9. A device associated with a first user, the device comprising:
   at least one processor;
   an audio input device;
   a communication unit; and
   a storage device that stores a message management module, wherein the at least one processor executes the message management module to:
      receive, via the communication unit, a message from a device associated with a second user;
      receive, via the audio input device, an audio input;
      determine, without outputting a request for instructions to the first user and based at least in part on the message from the device associated with the second user, the audio input, and contextual information, whether the first user and the second user are engaged in a conversation; and
      responsive to determining that the first user and the second user are engaged in the conversation:
         determine that the second user is an intended recipient of the outgoing communication;
         generate, based on the audio input, an outgoing communication as a response to the message received from the device associated with the second user; and
         send, via the communication unit, and without receiving user confirmation of the contents of the response or a user instruction to send the response, the outgoing communication to the second user.

10. The device of claim 9, wherein the at least one processor further executes the message management module to:
   determine, based at least in part on the message from the device associated with the second user, the audio input, and the contextual information, a probability that the first user intends to send the response to the message received from the device associated with the second user; and
   determine whether the first user and the second user are engaged in the conversation based at least in part on the probability.

11. The device of claim 10, further comprising:
   an audio output device,
   wherein the at least one processor further executes the message management module to:
      responsive to determining that the probability the user intends to send the response to the message received from the device associated with the second user does not satisfy the threshold probability:
         output, via the audio output device, a request for additional action by the first user;
         receive, via the audio input device; a second audio input indicative of the user's intent to send the response to the message received from the device associated with the second user; and
         send, via the communication unit and based at least in part on the second audio input, the response to the message.

12. The device of claim 10, wherein the at least one processor further executes the message management module to:
   prior to receiving the audio input, receive, via the communication unit, a message from a device associated with a third user;
   after receiving the message from the device associated with the second user:
      determine, based at least in part on the audio input and contextual information, a probability that the first user intends to send the outgoing communication as a response to the message received from the device associated with the third user;
      determine, based on the probability that the first user intends to send the outgoing communication as the response to the message received from the device associated with the second user and the probability that the user intends to send the outgoing communication as the response to the message received from the device associated with the third user, whether the user intends to send the outgoing communication as the response to the message received from the device associated with the second user or to the message received from the device associated with the third user; and
      responsive to determining that the user intends to send the outgoing communication as the response to the message received from the device associated with the third user:
         generate, based on the audio input, the outgoing communication as the response to the message received from the device associated with the third user; and
         send, via the communication network, the outgoing communication as the response to the message received from the device associated with the third user.

13. The device of claim 12,
   wherein the at least one processors executes the message management module to determine that the user intends to send the outgoing communication as the response to the message received from the device associated with the second user responsive to determining that the probability the user intends to send the outgoing communication as the response to the message received from the device associated with the second user satisfies the threshold probability but the probability that the user intends to send the outgoing communication as the response to the message received from the device associated with the third user does not satisfy the threshold probability, and
   wherein the at least one processors executes the message management module to determine that the user intends to send the outgoing communication as the response to the message received from the device associated with the third user is further responsive to determining that the probability the user intends to send the outgoing communication as the response to the message received from the device associated with the third user satisfies the threshold probability but the probability that the user intends to send the outgoing communication as the response to the message received from the device associated with the second user does not satisfy than the threshold probability.

14. The device of claim 12,
wherein the at least one processors executes the message management module to determine that the user intends to send the outgoing communication as the response to the message received from the device associated with the second user is further responsive to determining that the probability the user intends to send the outgoing communication as the response to the message received from the device associated with the second user satisfies the threshold probability and is greater than the probability that the user intends to send the outgoing communication as the response to the message received from the device associated with the third user, and
wherein the at least one processors executes the message management module to determine that the user intends to send the outgoing communication as the response to the message received from the device associated with the third user is further responsive to determining that the probability the user intends to send the outgoing communication as the response to the message received from the device associated with the third user satisfies the threshold probability and is greater than the probability that the user intends to send the outgoing communication as the response to the message received from the device associated with the second user.

15. The device of claim 9, further comprising:
an audio output device,
wherein the at least one processor further executes the message management module to:
determine a probability the user intends to listen to the message received from the device associated with the second user; and
responsive to determining that the probability the user intends to listen to the message received from the device associated with the second user satisfies a threshold probability for listening to messages:
generate, based on the message received from the device associated with the second user, audio data; and
output, via the audio output device, the audio data.

16. The device of claim 9, wherein the contextual information includes one or more of:
frequency of incoming messages from the device associated with the second user, frequency of outgoing messages to the device associated with the second user, time since the last received message from the device associated with the second user, or time since the last sent message to the device associated with the second user.

17. The device of claim 9, wherein the probability that the user intends to send the response to the message received from the device associated with the second user is not based a user command.

18. A non-transitory computer-readable storage medium comprising instructions that, when executed, configure one or more processors of a computing system to:
receive a message from a device associated with a second user;
receive an audio input;
determine, without outputting a request for instructions to the first user and based at least in part on the message from the device associated with the second user, the audio input, and contextual information, whether the first user and the second user are engaged in a conversation;
responsive to determining that the first user and the second user are engaged in the conversation:
determine that the second user is an intended recipient of the outgoing communication;
generate, based on the audio input, an outgoing communication as a response to the message received from the device associated with the second user; and
send, without receiving user confirmation of the contents of the response or a user instruction to send the response, the response to the message to the second user.

19. The non-transitory computer-readable storage medium of claim 18, wherein the instructions, when executed, further configure the one or more processors to:
prior to receiving the audio input, receive, via the communication unit, a message from a device associated with a third user;
after receiving the message from the device associated with the second user:
determine, based at least in part on the audio input and the contextual information, a probability that the first user intends to send the outgoing communication as a response to the message received from the device associated with the third user;
determine, based on the probability that the first user intends to send the outgoing communication as the response to the message received from the device associated with the second user and the probability that the user intends to send the outgoing communication as the response to the message received from the device associated with the third user, whether the user intends to send the outgoing communication as the response to the message received from the device associated with the second user or to the message received from the device associated with the third user; and
responsive to determining that the user intends to send the outgoing communication as the response to the message received from the device associated with the third user:
generate, based on the audio input, the outgoing communication as the response to the message received from the device associated with the third user; and
send the outgoing communication as the response to the message received from the device associated with the third user.

20. The non-transitory computer-readable storage medium of claim 18, wherein the instructions, when executed, further configure the one or more processors to:
determine a probability the user intends to listen to the message received from the device associated with the second user; and
responsive to determining that the probability the user intends to listen to the message received from the device associated with the second user satisfies a threshold probability for listening to messages:

generate, based on the message received from the device associated with the second user, audio data; and
output the audio data.

* * * * *